(12) United States Patent
Kawahata

(10) Patent No.: US 10,771,649 B2
(45) Date of Patent: Sep. 8, 2020

(54) MANAGEMENT SERVER FOR MANAGING MULTIPLE IDENTIFICATIONS OF AN IMAGE PROCESSING APPARATUS, AND INFORMATION PROCESSING SYSTEM AND INFORMATION PROCESSING METHOD THEREFOR

(71) Applicant: CANON KABUSHIKI KAISHA, Tokyo (JP)

(72) Inventor: Ryo Kawahata, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/529,353

(22) Filed: Aug. 1, 2019

(65) Prior Publication Data
US 2020/0076978 A1    Mar. 5, 2020

(30) Foreign Application Priority Data

Aug. 31, 2018    (JP) ................. 2018-163651

(51) Int. Cl.
*H04N 1/00* (2006.01)
(52) U.S. Cl.
CPC ..... *H04N 1/00925* (2013.01); *H04N 1/00344* (2013.01); *H04N 1/00973* (2013.01)
(58) Field of Classification Search
None
See application file for complete search history.

(56) References Cited

U.S. PATENT DOCUMENTS

| 2008/0071626 A1* | 3/2008 | Hill | G06Q 20/203 705/22 |
| 2018/0005308 A1* | 1/2018 | Ishida | G06Q 10/083 |

FOREIGN PATENT DOCUMENTS

JP    2018-005408    1/2018

* cited by examiner

*Primary Examiner* — Andrew H Lam
(74) *Attorney, Agent, or Firm* — Venable LLP

(57) ABSTRACT

A management server performs first registration by which first identification information is registered for a first web service, the first identification information being received from a first service server that provides the first web service and second registration by which second identification information is registered for a second web service, the second identification information being received from a second service server that provides the second web service; and the management server puts restriction on the second registration of the received second identification information in a case where the second identification is associated with the first identification information in a management unit, the second identification information being received by a receiving unit from the second service server, the first identification information being received from the first service server and registered by the first registration.

19 Claims, 12 Drawing Sheets

FIG.5A

SERVICE MANAGEMENT TABLE 500

| DEVICE ID | SERVICE ID | SERVICE TYPE | TRANSMISSION DESTINATION INFORMATION (URL) | DEVICE ID TYPE |
|---|---|---|---|---|
| FGHIJ456 | aa-bb-cc-dd | CONSUMABLES AUTOMATIC DELIVERY | https://www.a_shop.com/ink | SERIAL NUMBER |
| 12345ABCDEFG | dd-ee-ff-gg | CONSUMABLES AUTOMATIC DELIVERY | https://www.b_shop.com/ink | PRINTER ID |

FIG.5B

DEVICE ID MANAGEMENT TABLE 550

| PRINTER ID | SERIAL NUMBER |
|---|---|
| 12345ABCDEFG | ABCDE123 |

MANAGEMENT SERVER FOR MANAGING MULTIPLE IDENTIFICATIONS OF AN IMAGE PROCESSING APPARATUS, AND INFORMATION PROCESSING SYSTEM AND INFORMATION PROCESSING METHOD THEREFOR

BACKGROUND OF THE INVENTION

Field of the Invention

The present invention relates to a technique for registering an image processing apparatus for a web service.

Description of the Related Art

There is a consumables automatic delivery service in which an image processing apparatus notifies a consumables seller of information about the remaining amount of consumables such as ink and sheets via a web server, so that the consumables are automatically delivered to the user of the image processing apparatus. In such a web service, the user can select the consumables seller at the time of applying for the service.

In Japanese Patent Application Laid-Open No. 2018-005408 (hereinafter referred to as Document 1), it is disclosed that identification information of a consumables seller and static identification information (e.g., serial number) assigned to an image processing apparatus are managed in association with each other in order to receive provision of this kind of service.

In a system for providing services, prevention of duplicate registration for multiple consumables sellers is desired in order to prevent simultaneous delivery of consumables from multiple consumables sellers.

Here, the static identification information described in Document 1 may be changed at the time of repairing of the image processing apparatus. Additionally, in a case where the image processing apparatus is given to a new user, re-registration processing for the new user is difficult with the static identification information. Therefore, identification information which is dynamically issued by a server may be used as identification information of the image processing apparatus. That is, different types of identification information may be used even for the same image processing apparatus.

SUMMARY OF THE INVENTION

The management server according to an embodiment of the present invention is a management server used in an information processing system including an image processing apparatus, a service server, and the management server, the service server being configured to provide a web service, the management server being configured to manage registration of the image processing apparatus for the web service, the management server including: a management unit configured to manage first identification information and second identification information in association with each other, the first identification information and the second identification information corresponding to different types of identification information for identifying the image processing apparatus; a receiving unit configured to receive the first identification information or the second identification information from the service server; and a registration unit configured to perform first registration by which the first identification information is registered for a first web service, the first identification information being received by the receiving unit from a first service server that provides the first web service and second registration by which the second identification information is registered for a second web service, the second identification information being received by the receiving unit from a second service server that provides the second web service, and wherein the registration unit is configured to put restriction on the second registration of the received second identification information in a case where the second identification information is associated in the management unit with the first identification information having already been registered by the first registration.

Further features of the present invention will become apparent from the following description of exemplary embodiments with reference to the attached drawings.

BRIEF DESCRIPTION OF THE DRAWINGS

FIGS. 5A and 5B are diagrams illustrating tables managed by a management server;

DESCRIPTION OF THE EMBODIMENTS

Figure 1:
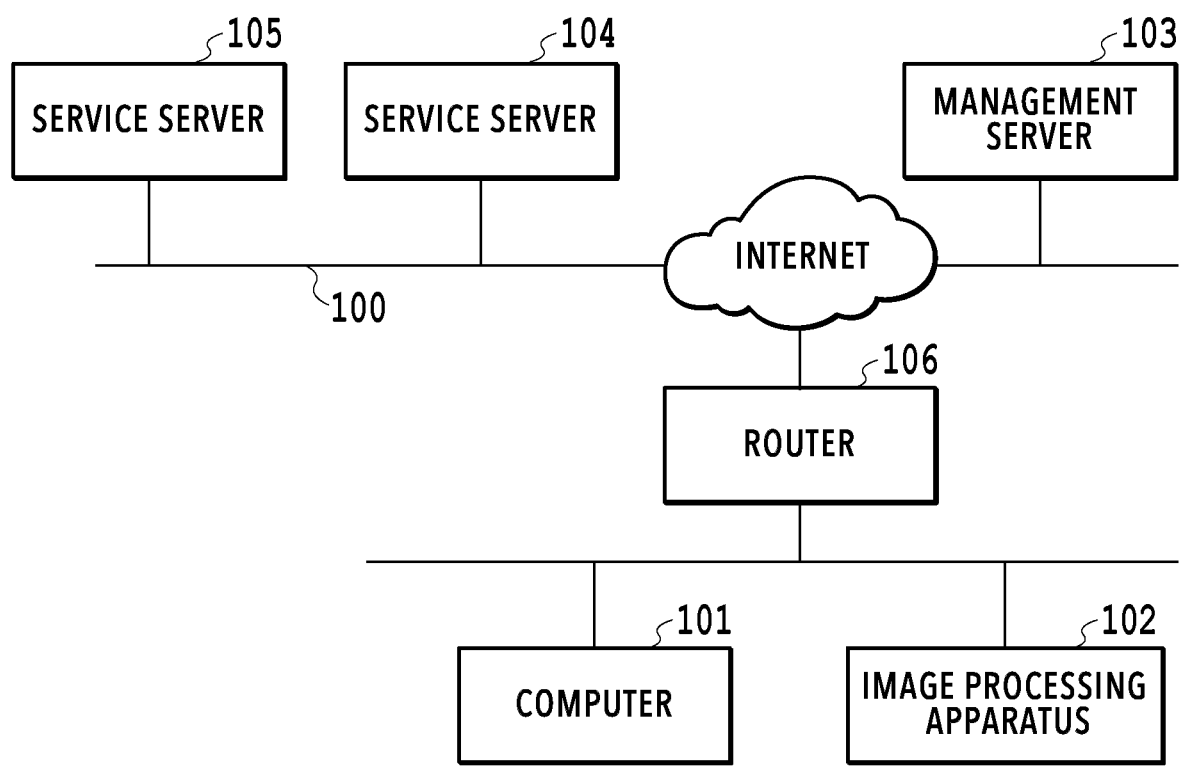
FIG. 1 is a diagram illustrating an example of the system configuration.

Hereinafter, a detail explanation is given of embodiments of the present invention with reference to the attached drawings. It should be noted that the following embodiments do not limit the present invention according to the claims and that every combination of the characteristics explained in the present embodiments is not essential to the solution means of the present invention.

First Embodiment

Prior to an explanation of the embodiment, a supplemental explanation is given of the case in which different types of identification information are used even for the same image processing apparatus. For example, whether static identification information, which is fixedly assigned to an image processing apparatus, is used or dynamic identification information, which is issued by a server, is used depends on the service form of a consumables seller.

In a mode in which a user applies for a service at the same time as purchasing of an image processing apparatus, registration for the service is performed in a state where the image processing apparatus is unopened. Therefore, static identification information (e.g., serial number or MAC address), which is preliminarily assigned to the image processing apparatus, is used as information for identifying the image processing apparatus.

On the other hand, in a mode in which a user applies for a service after purchasing an image processing apparatus, registration for the service is performed by the user on the Web after the image processing apparatus is opened. Here, in a case where static identification information is used, such a problem as follows occurs, for example. That is, as described above, in the case of after the image processing apparatus is purchased, static identification information may be changed at the time of repairing of the image processing apparatus. Furthermore, in a case where the image processing apparatus is given to a new user, the same static identification information may be used for the old user and the new user. Therefore, in a mode in which a user applies for a service after purchasing an image processing apparatus, dynamic identification information issued in the system of the consumables automatic delivery service is used. In addition, there may be a case in which identification information designated by a consumables seller is used as information for identifying the image processing apparatus in accordance with a demand from the consumables seller.

As described above, depending on the service form of a consumables seller, different types of identification information may coexist as information for identifying the same image processing apparatus. In this case, for example, even though prevention of duplicate registration of a first image processing apparatus is confirmed with static identification information of the first image processing apparatus, the first image processing apparatus may be registered for the service with dynamic identification information. This results in occurrence of simultaneous delivery of consumables from multiple consumables sellers. In the present embodiment, an explanation is given of a system for preventing duplicate registration for multiple consumables sellers.

<System Configuration>

FIG. 1 is a diagram illustrating an example of an information processing system according to the present embodiment. The information processing system of FIG. 1 is configured of a client-server type network system. The information processing system includes: a computer 101, which is an information processing apparatus; an image processing apparatus 102; a management server 103; a service server 104; and a service server 105. The image processing apparatus 102 and the computer 101 are connected to the management server 103, the service server 104, and the service server 105 via the router 106 and the Internet 100. The management server 103 is a server owned by a vendor of the image processing apparatus 102. Further, the service server 104 and the service server 105 are servers owned by consumables sellers, respectively. As for communications between the respective servers, control through HTTP, XMPP, or the like, is performed. Note that, as for the protocol, another protocol may be used.

<Hardware Configuration of Computer>

Figure 2:
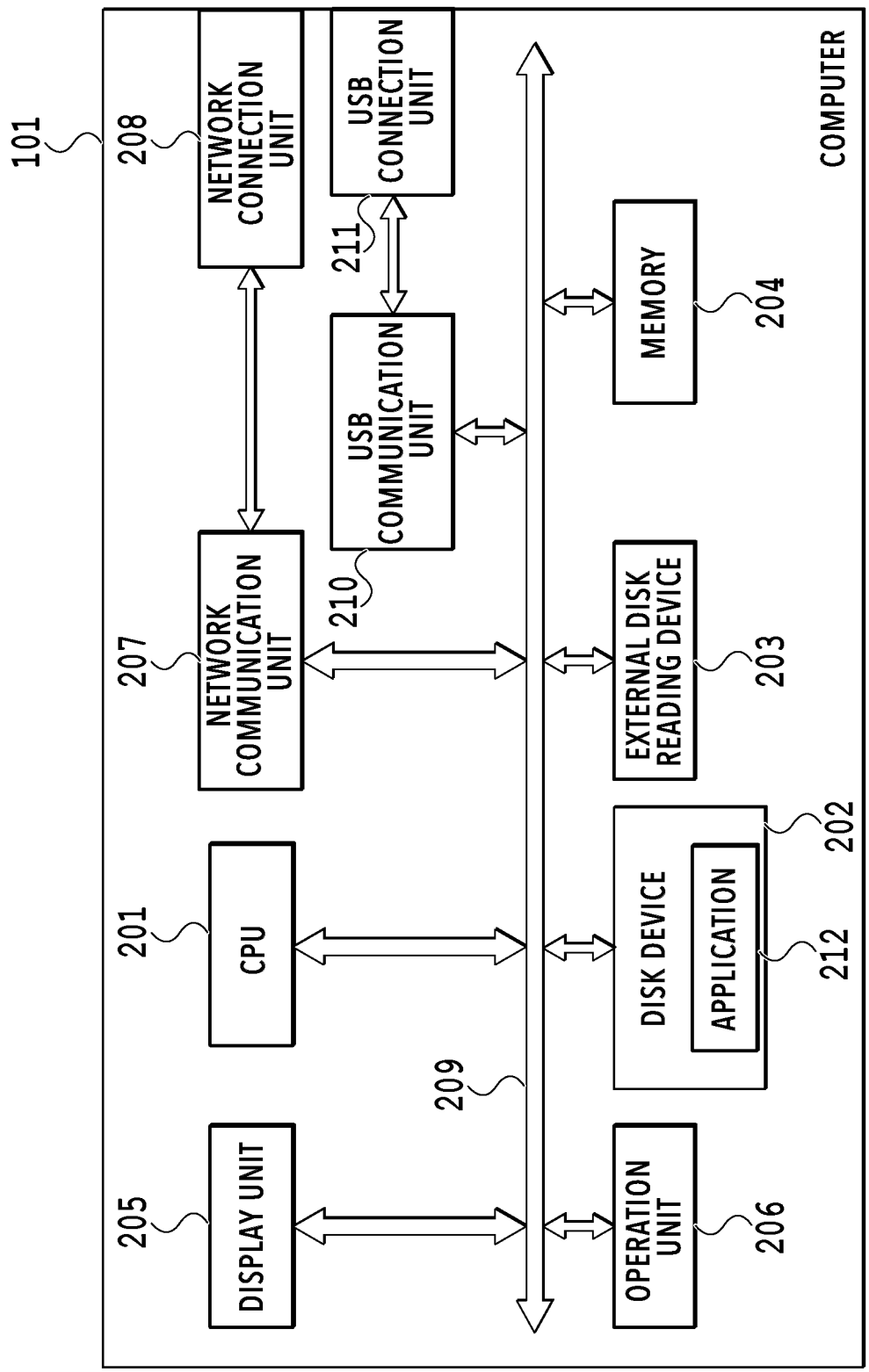
FIG. 2 is a diagram illustrating an example of the hardware configuration of a computer.

FIG. 2 is a diagram illustrating an example of the hardware configuration of the computer 101. The computer 101 includes a CPU 201, a disk device 202, an external disk reading device 203, a memory 204, a display unit 205, and an operation unit 206. Further, the computer 101 includes a network communication unit 207, a network connection unit 208, a USB communication unit 210, and a USB connection unit 211.

The CPU 201 is a central processing unit for controlling each unit of the computer 101. The disk device 202 stores various kinds of files as well as an OS and an application 212 to be read out by the CPU 201. The external disk reading device 203 is a device for reading out data such as a file stored in an external storage medium such as an SD card. The memory 204 is configured with a RAM or the like, which is used by the CPU 201 for temporary storage of data, buffering of data, etc., as needed. The display unit 205 is configured with an LCD, for example, and displays various kinds of information. The operation unit 206 includes a keyboard, a mouse, and the like, for a user to perform various kinds of input operations. The network communication unit 207 is connected to the router 106 via the network connection unit 208. That is, the network communication unit 207 is connected to a network such as the Internet 100 via the network connection unit 208 and performs various kinds of communications. The network communication unit 207 corresponds to a wired LAN or a wireless LAN. In a case where the network communication unit 207 corresponds to a wired LAN, the network connection unit 208 is a connector for connecting a cable of a wired LAN, and, in a case where the network communication unit 207 corresponds to a wireless LAN, the network connection unit 208 is an antenna. The USB communication unit 210 is connected to various kinds of peripheral apparatuses (e.g., the image processing apparatus 102) via the USB connection unit 211 to perform various kinds of communications. The respective units described above are mutually connected via a bus 209. Note that, although the computer 101 is taken as an example of the information processing apparatus in the explanation of the present embodiment, the present invention is not limited thereto. For example, an information processing terminal such as a smartphone or a tablet may be used as the information processing apparatus.

<Hardware Configuration of Image Processing Apparatus>

Figure 3:
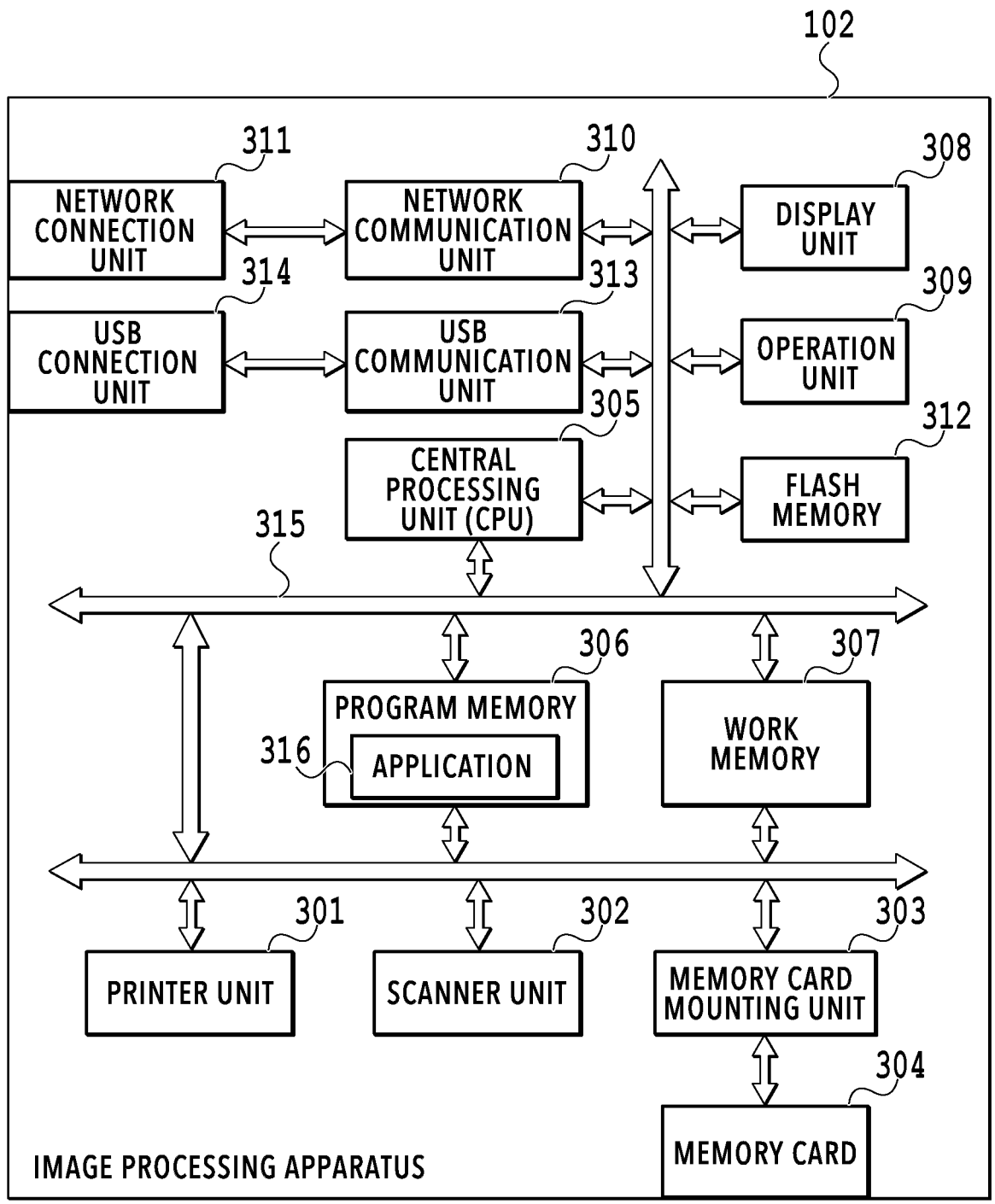
FIG. 3 is a diagram illustrating an example of the hardware configuration of an image processing apparatus.

FIG. 3 is a diagram illustrating an example of the hardware configuration of the image processing apparatus 102. The image processing apparatus 102 includes a printer unit 301, a scanner unit 302, a memory card mounting unit 303, and a memory card 304. Further, the image processing apparatus 102 includes a CPU 305, a program memory 306, a work memory 307, a display unit 308, and an operation unit 309. Moreover, the image processing apparatus 102 includes a network communication unit 310, a network connection unit 311, a flash memory 312, a USB communication unit 313, and a USB connection unit 314. Although the image processing apparatus 102, which is a multifunctional peripheral, is taken as an example of the image processing apparatus in the explanation of the present embodiment, the image processing apparatus may be a copy machine, a facsimile, or the like. Furthermore, the image processing apparatus may be a printer without a scanner function as well. In the image processing apparatus 102, the print function is implemented by the printer unit 301; the scanner function is implemented by the scanner unit 302; and the storage function is implemented by the memory card mounting unit 303 and the memory card 304. The printer unit 301 prints image data received from the outside, image data stored in the memory card 304, or the like, on a print sheet by a recording system such as an ink jet system or an electrophotographic system. Further, the printer unit 301 also manages ink information including the ink remaining amount and sheet information including the number of loaded sheets.

The scanner unit 302 optically reads a document set on a platen (not illustrated in FIG. 3) and converts the document into digital data. Further, the scanner unit 302 transmits image data, which is converted into a designated file format, to an external apparatus via a network or stores the image data in a storage area (not illustrated in FIG. 3) such as an HDD. Further, in order to implement copying, the scanner unit 302 reads a document placed on the platen to generate image data and transfers the image data to the printer unit 301, and the printer unit 301 prints the image data on a print sheet. The memory card 304 mounted in the memory card mounting unit 303 stores various kinds of file data. The various kinds of file data can be read out and edited by use of an external apparatus via a network. Further, it is also possible to store file data in the memory card 304 by use of an external apparatus.

The CPU 305 is a central processing unit for controlling each unit in the image processing apparatus 102. The program memory 306 is configured with a ROM or the like and stores various program codes and an application 316 for communicating with a server apparatus. Further, the application 316 accesses the printer unit 301 to obtain consumables information about ink, sheets, etc. The work memory 307 is configured with a RAM or the like and temporarily stores or buffers image data, a job log, etc., for executing each service. The display unit 308 is configured with an LCD, for example, and displays various kinds of information. The operation unit 309 includes a switch, etc., for a user to perform various kinds of input operations. The network communication unit 310 is connected to the router 106 via the network connection unit 311. That is, the network communication unit 310 is connected to a network such as the Internet 100 via the network connection unit 311 to perform various kinds of communications. For each communication, control through HTTP, XMPP, etc., is performed. Note that, as for the protocol, another protocol may be used. The network communication unit 310 corresponds to a wired LAN or a wireless LAN. In a case where the network communication unit 310 corresponds to a wired LAN, the network connection unit 311 is a connector for connecting a cable of a wired LAN, and, in a case where the network communication unit 310 corresponds to a wireless LAN, the network connection unit 311 is an antenna. The flash memory 312 is a non-volatile memory for storing image data, etc., received by the network communication unit 310. The USB communication unit 313 is connected to various kinds of peripheral apparatuses (e.g., the computer 101) via the USB connection unit 314 to perform various kinds of communications. The respective units described above are mutually connected by a bus 315.

<Hardware Configuration of Server>

Figure 4:
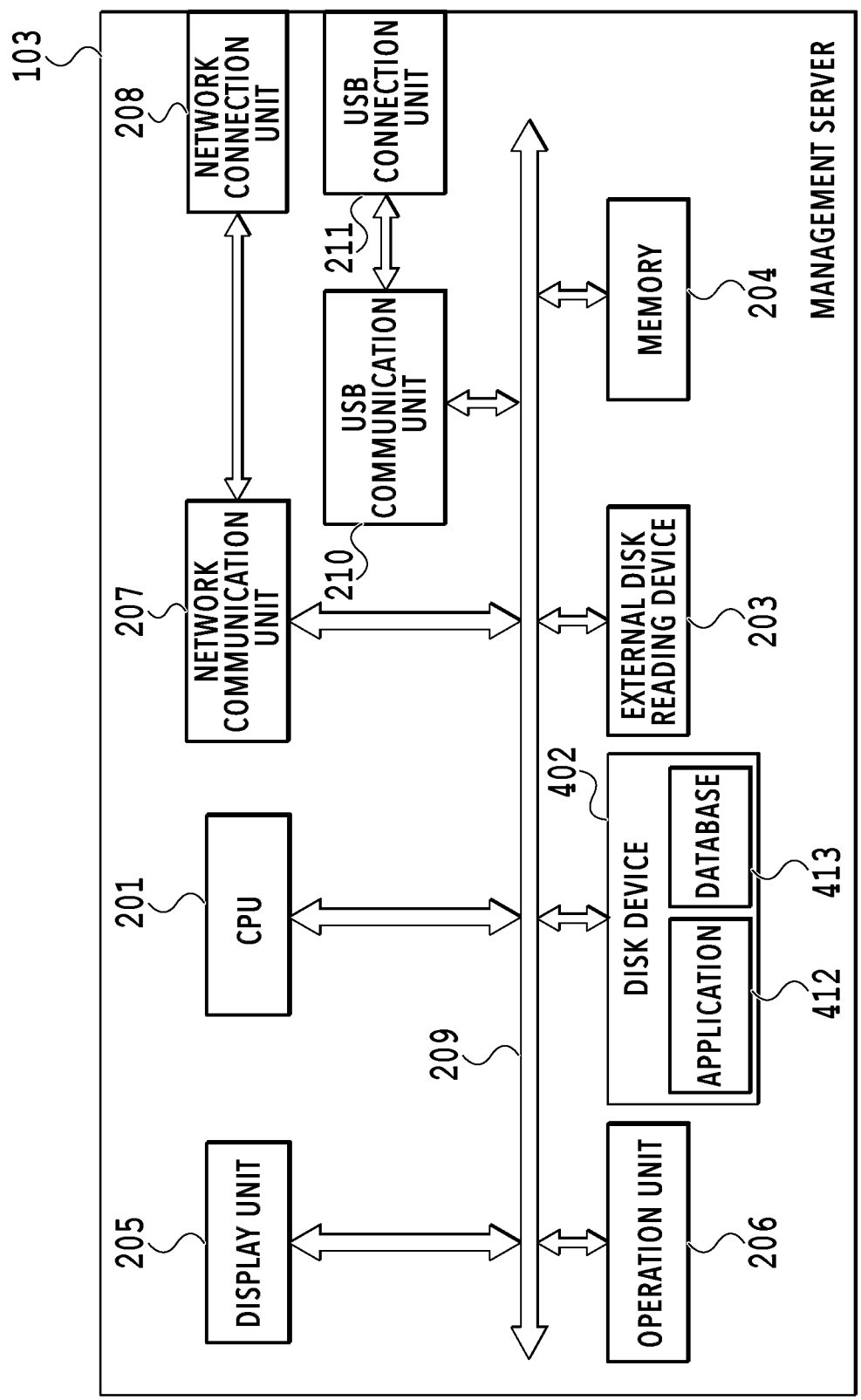
FIG. 4 is a diagram illustrating an example of the hardware configuration of a server.

FIG. 4 is a block diagram illustrating the hardware configuration of the management server 103. The service server 104 and the service server 105 have the same hardware configuration as well. Note that the same signs are attached to the same configurations of the computer 101 illustrated in FIG. 2 to omit the explanation thereof. The disk device 402 of each of the management server 103 and the service servers 104 and 105 stores various kinds of files in addition to an OS, a database 413, and an application 412 to be read out by the CPU 201.

<Tables Stored in Management Server>

FIGS. 5A and 5B are diagrams for explaining tables stored in the database 413 of the management server 103. The service management table 500 illustrated in FIG. 5A is a table including five columns: a device ID, a service ID, a service type, transmission destination information (URL), and a device ID type. "DEVICE ID" is identification information for identifying an image processing apparatus. The device ID is, for example, a serial number or a printer ID. "SERVICE ID" is information for identifying a service server 104 or a service server 105. "SERVICE TYPE" is information for identifying the type of a service. "TRANSMISSION DESTINATION INFORMATION" is indicative of information about a notification destination for notifying status information (e.g., consumables information such as the ink remaining amount and the sheet remaining amount) of an image processing apparatus. Specifically, the transmission destination information is an URL of the service server 104 or the service server 105. "DEVICE ID TYPE" is indicative of the type of the device ID included in the same record. Specifically, the device ID type is indicative of the type of identification information of an image processing apparatus, such as a serial number or a printer ID. Note that a serial number is static identification information (also referred to as first identification information) for identifying an image processing apparatus and is uniquely assigned to an image processing apparatus. The printer ID is dynamic identification information (also referred to as second identification information) for identifying an image processing apparatus and is issued by the management server 103. The information registered in the service management table 500 is referred to as service information.

The device ID management table 550 illustrated in FIG. 5B is a table including two columns: a printer ID and a serial number. As explained above, "PRINTER ID" is dynamic identification information of an image processing apparatus, which is issued by the management server 103. "SERIAL NUMBER" is static identification information of an image processing apparatus, which is assigned at the time of manufacture. That is, the device ID management table 550 is a table in which dynamic identification information and static identification information of an image processing apparatus are associated with each other. Note that the information registered in the device ID management table 550 is referred to as device registration information. It should be noted that the configurations of the tables illustrated in FIGS. 5A and 5B are merely examples, and the tables that can be used in the present embodiment are not limited to those described above.

<Processing Executed by System>

Figure 6:
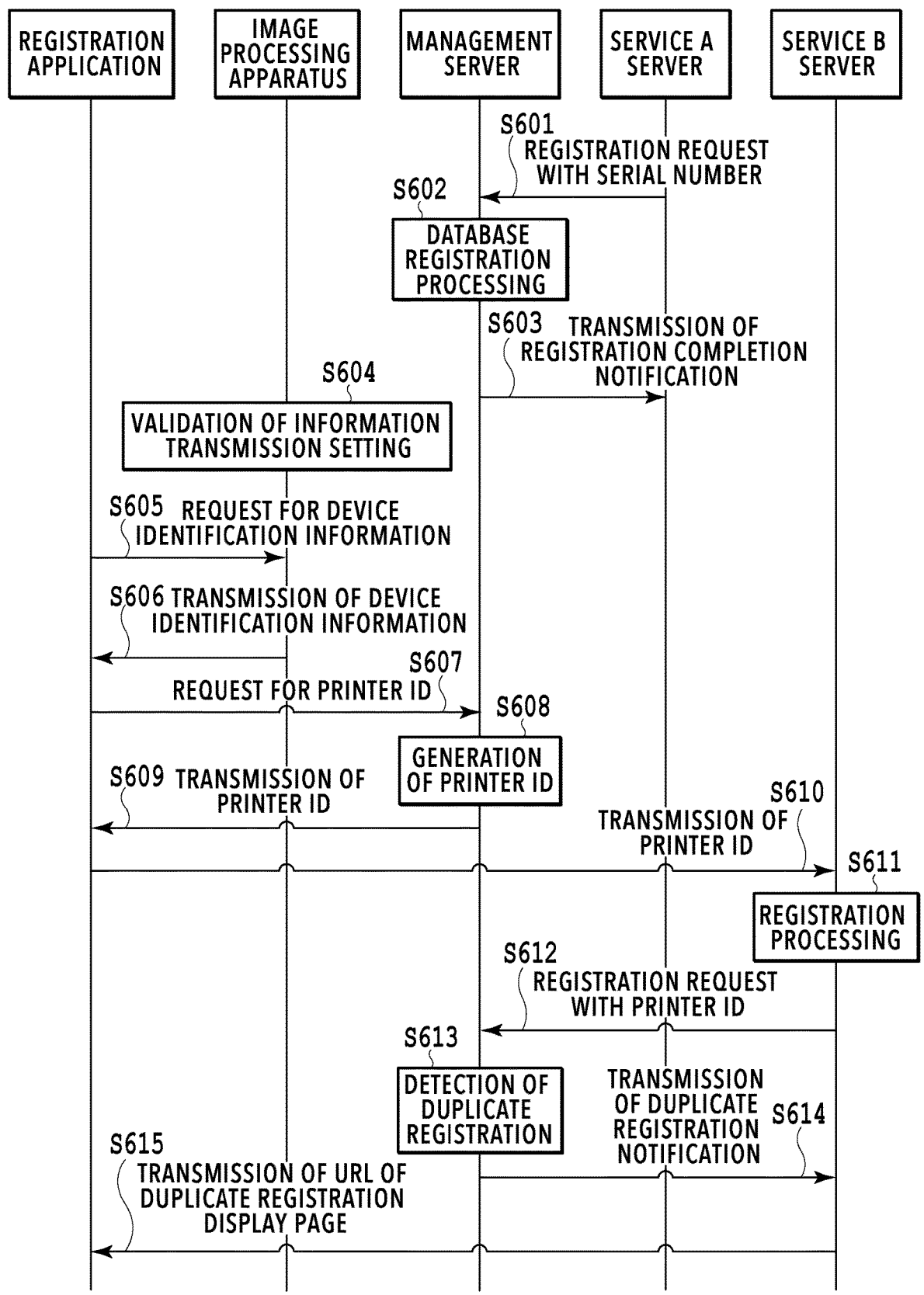
FIG. 6 is a sequence diagram illustrating an example of the flow of processing executed by the system.

FIG. 6 is a sequence diagram illustrating an example of processing executed by the system in the present embodiment. The processing in FIG. 6 includes: processing of registering a serial number in the management server 103 as identification information (also referred to as an identifier) of an image processing apparatus; and processing of registering a printer ID in the management server 103 as identification information (also referred to as an identifier) of an image processing apparatus. Further, the processing of FIG. 6 includes: processing in which the management server 103 generates a printer ID; and processing in which registration is determined to be duplicate registration and a duplicate registration notification is transmitted to the service server 104. Here, it is assumed that the user applies for Service A at the time of purchasing the image processing apparatus 102 and then applies for a service of Service B on the Web after setup of the image processing apparatus 102. Note that the service server 104 which deals with Service A is referred to as a Service A server. The service server 105 which deals with the service of Service B is referred to as a Service B server. Here, although a mode in which Service A and Service B are provided by separate servers is taken as an example, Service A and Service B may be provided by the same server. Note that it is assumed that Service A and Service B are services of the same type (here, consumables automatic delivery service). For registration for a service on the Web, a registration application is used. Although the registration application is one of applications 212 stored in the disk device 202 of the computer 101, the registration application may be launched in any apparatuses in which the application can operate.

The series of processing illustrated in the sequence of FIG. 6 is performed by the CPUs of the computer 101, the image processing apparatus 102, the management server 103, and the service servers 104 and 105 retrieving program codes stored in the disk devices, etc., into the RAMs and executing the program codes. Alternatively, a part or all of the functions in the steps of FIG. 6 may be implemented by hardware such as an ASIC or an electronic circuit. Note that the symbol "S" in the explanation of each process means that it is a step in the flowchart.

In S601, the Service A server transmits, to the management server 103, a service registration request with a serial number (also referred to as serial number registration request). Together with the registration request, the Service A server transmits the serial number of the image processing apparatus 102, the service ID, the service type, and the transmission destination information to the management server 103.

In S602, the management server 103 registers the serial number, the service ID, the service type, and the transmission destination information received in S601 in association with each other. Specifically, the management server 103 registers and holds the above-mentioned service information in the service management table 500 illustrated in FIG. 5A. Here, "SERIAL NUMBER" is registered in an associated manner in the column "DEVICE ID TYPE" in the service management table 500.

In S603, as a response to the service registration request received in S601, the management server 103 transmits a service registration completion notification, which indicates that registration for the service has been completed, to the Service A server. Thereby, the management server 103 completes registration for Service A, which is provided by the Service A server, such that Service A is associated with the serial number. The processes from S601 to S603 correspond to, for example, a mode in which a user applies for Service A at the time of purchasing the image processing apparatus 102.

Then, in S604, the image processing apparatus 102 detects that the user has validated an information transmission setting through the operation unit 206. By this operation, the image processing apparatus 102 becomes able to communicate with the management server 103. Note that, in S604, it is assumed that the user has completed an initial setting of the image processing apparatus 102, settings of network connection and PC connection for the image processing apparatus 102, etc. Furthermore, although not illustrated in FIG. 6, the image processing apparatus 102 then regularly or irregularly transmits status information including information about consumables such as ink, toner, and sheets to the management server 103, and the management server 103 transmits information to the Service A server as needed. The processes after S605 are processes in a case where the user attempts to register the image processing apparatus 102 for Service B in a state where the image processing apparatus 102 has already been registered for Service A.

In S605, the registration application requests the image processing apparatus 102 for device identification information. The device identification information includes static information such as the serial number or MAC address of the image processing apparatus 102. In S606, the image processing apparatus 102 transmits the device identification information to the registration application as a response to S605.

Figure 7:
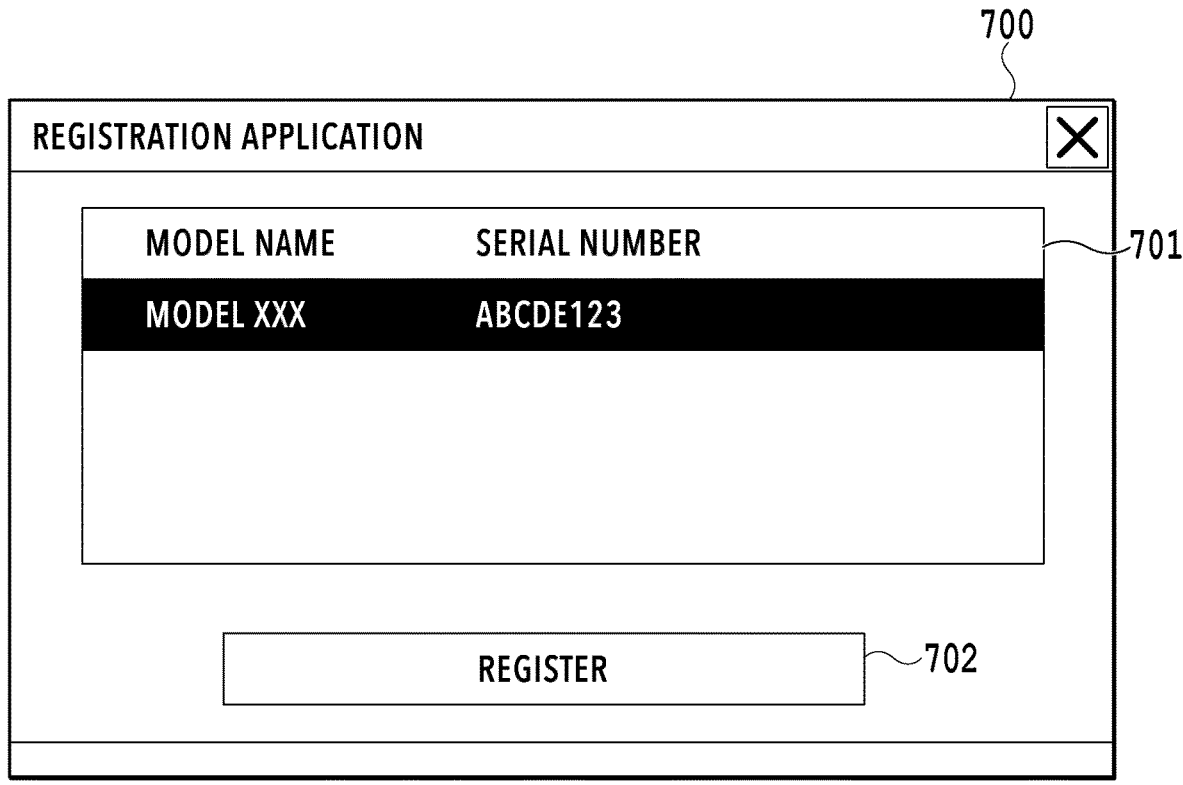
FIG. 7 is a schematic diagram of a user interface of a registration application.

FIG. 7 is a diagram schematically illustrating a user interface of the registration application. Upon being launched by a user operation, the registration application displays a UI 700. Further, the registration application searches for printers connected to the computer 101 via USB or printers present on the same network and displays a list of printers on a list display unit 701 in the order found. Although FIG. 7 illustrates an example in which one image processing apparatus 102 "MODEL XXX" is found, the model name and the serial number are written together so that, in a case where multiple image processing apparatuses of the same model are found, it is possible for the user to select an image processing apparatus to be registered. For the serial number, it is possible to use information replied in response to the request of S605. In a case where the item "MODEL XXX", which is indicative of the image processing apparatus 102 that the user would like to register, is selected by the user from among the image processing apparatuses displayed in the list on the list display unit 701 and the registration button 702 is pressed, the below-described process of S607 is performed. As described above, in a case where the registration application is launched, the processes illustrated in S605 and S606 are performed. Returning back to FIG. 6, the explanation of the sequence is continued.

In S607, the registration application transmits a request for a printer ID (also referred to as a printer ID issuance request) to the management server 103. Together with the request for a printer ID, the registration application also transmits the device identification information obtained in S606 to the management server 103.

In S608, the management server 103 generates (or issues) a printer ID based on the printer ID issuance request received in S607. Further, the management server 103 manages and holds the issued printer ID and the device identification information received in S607 in association with each other. Specifically, the management server 103 registers and holds the serial number and the printer ID in the device ID management table 550 illustrated in FIG. 5B.

In S609, the management server 103 transmits the printer ID generated in S608 to the registration application as a response to the printer ID issuance request in S607.

In S610, the registration application transmits the printer ID obtained in S609 to the Service B server. For example, the registration application opens a web browser with designation of a URL of a page for service registration (also referred to as a service registration page). Upon input of predetermined information, the registration application provides predetermined information including the printer ID to the web browser and causes the web browser to transmit the information to the Service B server. Note that the service registration page is a web page provided by a service server, and the URL of the service registration page is preliminarily managed by the registration application.

Figure 8:
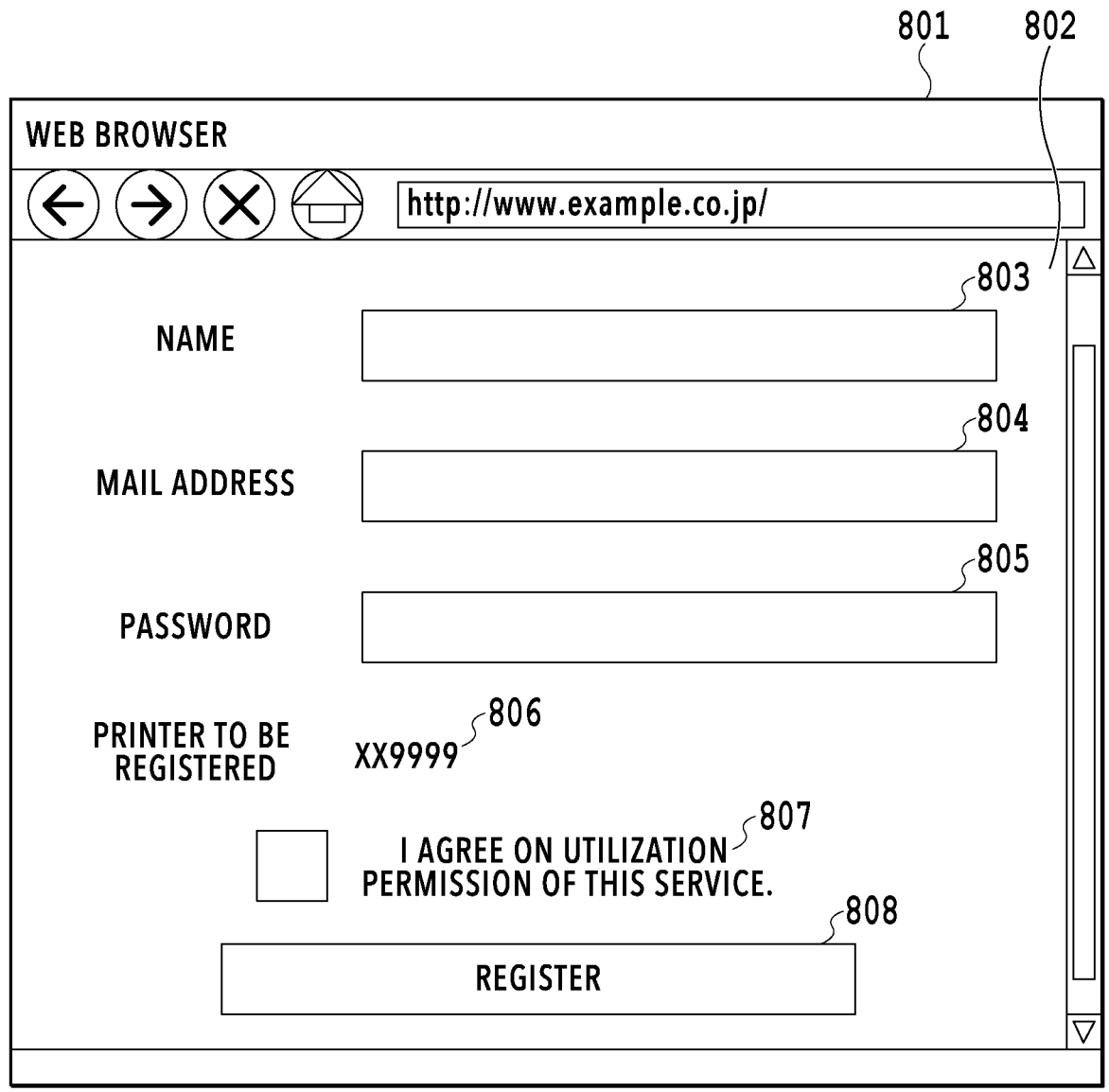
FIG. 8 is a schematic diagram of a registration page of a web service.

FIG. 8 is a diagram schematically illustrating a registration page of a web service displayed by the registration application on the web browser 801 of the computer 101. The registration page 802 includes a name entry field 803, a mail address entry field 804, a password entry field 805, a registration target printer display field 806, a utilization permission agreement check box 807, and a registration button 808. Note that, in the registration target printer display field 806, an image processing apparatus name, which the web browser 801 has received from the registration application, is displayed. The user enters a name, a mail address, and a password, then places a check in the utilization permission agreement check box 807, and then presses the registration button 808. In response, the web browser 801 transmits the printer ID and the printer name to the Service B server. Then, as described below, the Service B server transmits, to the management server 103, a request for registering the printer ID received from the registration application. Returning back to FIG. 6, the explanation of the sequence is continued.

In S611, the Service B server detects that the user has entered user information such as a user name and a mail address on the service registration page 802 illustrated in FIG. 8 and pressed the registration button 808. Then, the Service B server stores the user information and the printer ID in association with each other. The user information registered in association with the printer ID is used for various services.

In S612, the Service B server transmits, to the management server 103, a service registration request with the printer ID (also referred to as a printer ID registration request). Together with the registration request, the Service B server transmits, to the management server 103, the printer ID obtained in S610, the service ID, the service type, and the transmission destination information.

In S613, the management server 103 performs service duplicate registration determination processing to determine whether registration with the printer ID received in S612 is duplicate registration. Details of the service duplicate registration determination processing will be described later. As explained above, in the processing of FIG. 6, the image processing apparatus 102 has already been registered for the Service A server. Therefore, in S613, the registration is determined to be duplicate registration.

In S614, the management server 103 transmits a duplicate registration notification to the Service B server as a response to S612.

In S615, as a response to the transmission of the printer ID in S610, the Service B server replies to the registration application with a URL of a page for displaying duplicate registration (also referred to as a duplicate registration display page). Then, the registration application opens the web browser with designation of the URL of the duplicate registration display page to display the duplicate registration display page.

Figure 9:
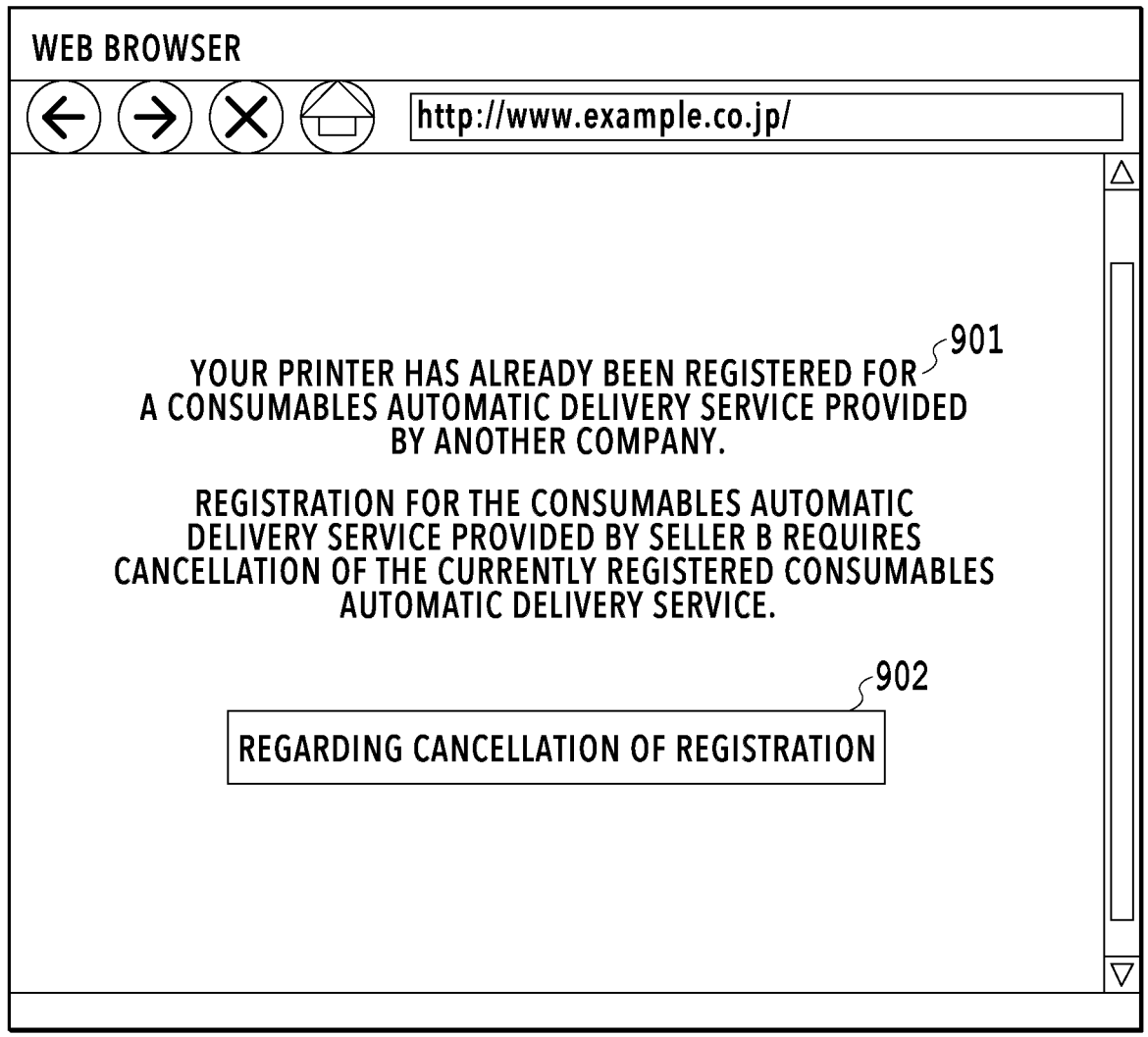
FIG. 9 is a schematic diagram of a duplicate registration display page.

FIG. 9 is a diagram schematically illustrating the duplicate registration display page. The explanatory text 901 includes a sentence indicating that the image processing apparatus 102 has already been registered for a service by another company and that service registration for Service B requires cancellation of the service registration for another company. In a case where the button 902 is pressed, an explanation page regarding cancellation of service registration is displayed. The user may cancel the existing service registration and switch service providers. Alternatively, after recognizing that the image processing apparatus 102 has already been registered, the user may stop the service registration that is currently in the registration processing. In the present embodiment, withdrawal and switch of service providers can be freely performed.

The above is the explanation of the series of processes in FIG. 6. Note that, although not illustrated in FIG. 6, in a case where the duplicate registration is resolved subsequently, the image processing apparatus 102 regularly or irregularly transmits status information indicative of a status of the image processing apparatus 102 to the management server 103. The management server 103 refers to the consumables information received from the image processing apparatus 102, and, in a case where there is an ink tank of which the ink remaining amount is equal to or less than Threshold value X, the consumables information is transmitted to the notification destination URL (i.e., service server) included in the service management table 500. In response, the service server performs processing for automatic delivery of consumables.

<Restriction Processing for Duplicate Registration>

Figure 10:
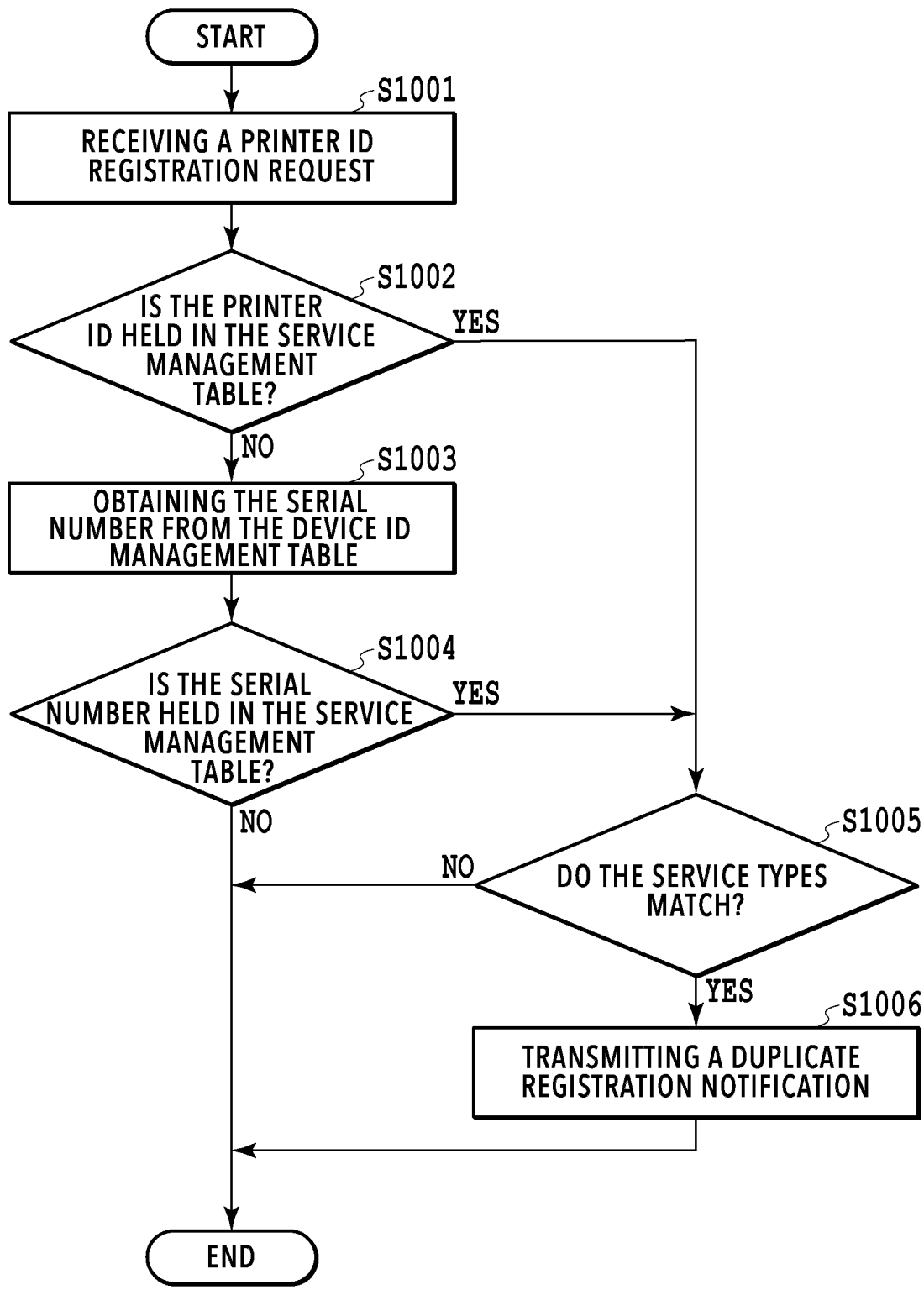
FIG. 10 is a flowchart of duplicate registration restriction processing.

FIG. 10 is a flowchart illustrating an example of restriction processing for duplicate registration of S613, which is performed by the management server 103. The management server 103 is configured to be able to notify a service server of duplicate registration in a case that registration of an image processing apparatus identified by a printer ID included in a printer ID registration request is determined to be duplicate registration.

In S1001, the management server 103 receives a printer ID registration request, which is transmitted from the service server 105 (also referred to as Service B server). That is, the management server 103 receives and obtains a printer ID registration request including a printer ID, a service ID, a service type, and transmission destination information. In S1002, the management server 103 determines whether the printer ID obtained in S1001 is held in the service management table 500. In a case where the determination result is YES, the processing proceeds to S1005, and, in a case where the determination result is NO, the processing proceeds to S1003. Note that the management server 103 may perform the determination process of S1002 with reference to a record in which "DEVICE ID TYPE" is "PRINTER ID" in the service management table 500.

As explained above, the service management table 500 manages a device ID (e.g., serial number or printer ID) registered for a service. Therefore, in a case where the printer ID received in S1001 has already been held in the service management table 500, there is a possibility of duplicate registration. On the other hand, even in a case where the printer ID received in S1001 has not already been held in the service management table 500, there is a possibility that service registration with the serial number has already been performed. Therefore, determination processing is further performed according to the determination result of S1002.

In S1003, the management server 103 obtains, from the device ID management table 550, the serial number associated with the printer ID obtained in S1001. Note that the printer ID obtained in S1001 is issued by the management server 103, and the corresponding serial number is registered in the device ID management table 550. In S1003, the management server 103 obtains the serial number associated with the registered printer ID.

In S1004, the management server 103 determines whether the serial number obtained in S1003 is held in the service management table 500. In a case where the determination result is YES, the processing proceeds to S1005, and, in a case where the determination result is NO, the series of processing ends. That is, the management server 103 determines whether there is a service for which the image processing apparatus corresponding to the printer ID is registered with the serial number. In a case where there is no service registered with the obtained printer ID and there is no service registered with the serial number corresponding to the obtained printer ID, the registration is determined not to be duplicate registration, and therefore the processing ends.

Next, an explanation is given of the process of S1005. The case where the processing proceeds to S1005 is a case where there is a service registered with the obtained printer ID or where there is a service registered with the serial number corresponding to the obtained printer ID. In S1005, the management server 103 determines whether the service type included in the service information obtained at the time of the determination of S1002 or S1004 matches the service type obtained in S1001. In a case where the determination result is YES, the processing proceeds to S1006, and, in a case where the determination result is NO, the series of processing ends. Even though the service corresponding to the obtained printer ID has already been registered, it is not necessary to handle the registration as duplicate registration in a case of a different service type (for example, in a case of not consumables automatic delivery service). Therefore, in S1005, the registration is determined to be duplicate registration for a service on a condition of matching of the service types. Note that the process of S1005 may be skipped in a case where the service provided in the system does not include any service that can coexist with another service.

In S1006, as a response to S1001, the management server 103 transmits, to the service server 105, a notification that the printer ID received in S1001 has already been registered for another service. Then, the processing ends.

Effect of Present Embodiment

As described above, in the present embodiment, an image processing apparatus registered for a service with static identification information and an image processing apparatus registered for a service with dynamic identification information are managed together by the management server 103. Further, the management server 103 also manages the correspondence between static identification information and dynamic identification information. Therefore, even in such a system that static identification information and dynamic identification information may be used for the same image processing apparatus, duplicate registration for a service can be prevented. Needless to say, even in a case where registration is requested with duplicate static identification information or where registration is requested with duplicate dynamic identification information, duplicate registration for a service can be prevented.

Therefore, according to the present embodiment, it is possible to prevent duplicate registration for a service even in a case where different identification information of an image processing apparatuses is used by each consumables seller. Note that, although a serial number is utilized as static identification information and a printer ID is utilized as dynamic identification information in the present embodiment, the present invention is not limited thereto. The same effect can be obtained even in a case of utilizing another identification information (e.g., MAC address).

Second Embodiment

In the first embodiment, an explanation has been given of processing in which the management server 103 determines whether registration is duplicate registration in a case of receiving a registration request with a printer ID from the service server 105 in S612. In the present embodiment, an explanation is given of processing in which the management server 103 determines whether registration is duplicate registration in a case of receiving a printer ID issuance request from the registration application in S607. Note that the following description mainly explains differences from the above-described embodiment, and the explanation of the same contents as the above-described embodiment is omitted as appropriate.

<Processing Executed by System>

Figure 11:
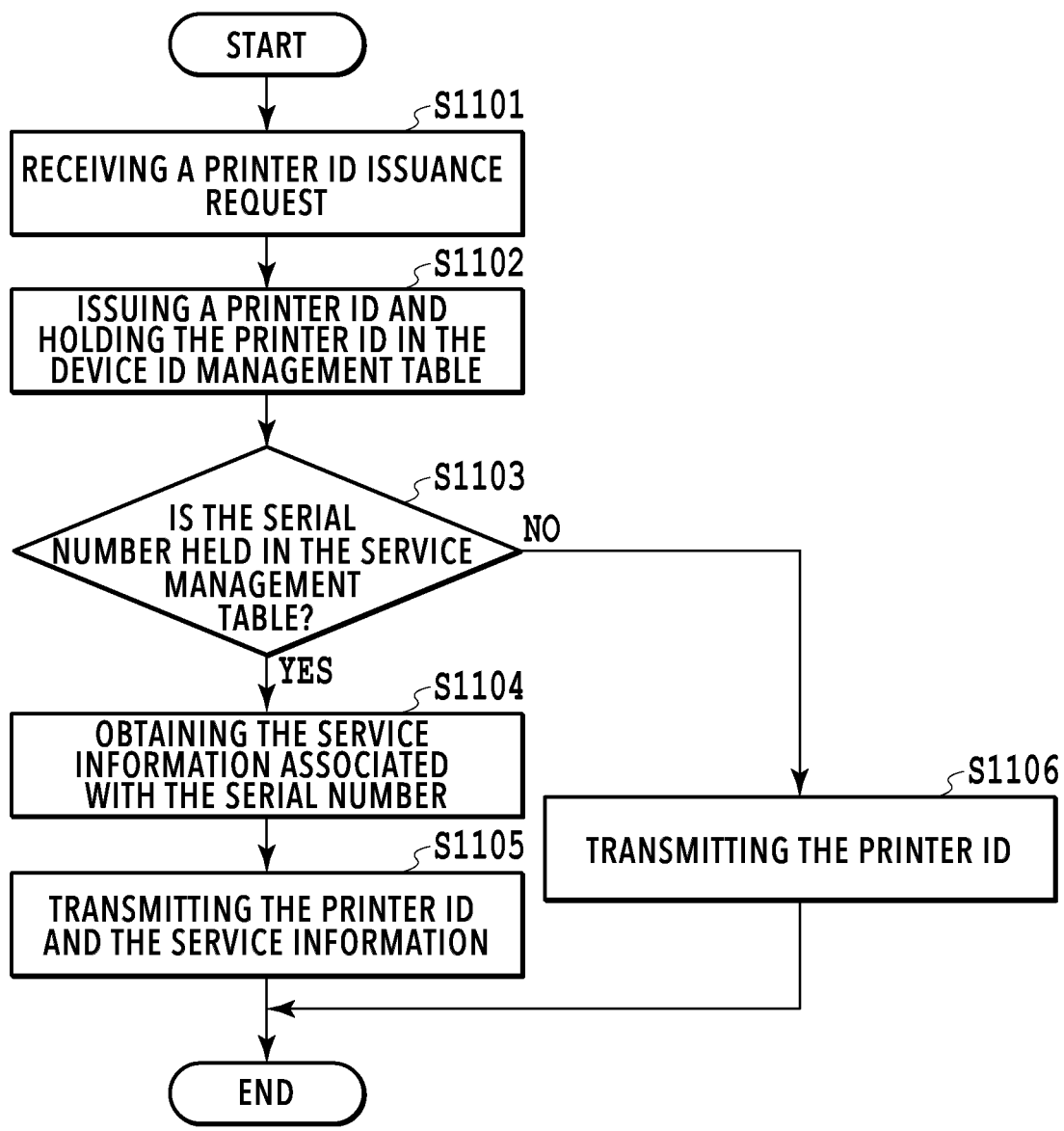
FIG. 11 is a flowchart of duplicate registration restriction processing.

FIG. 11 is a flowchart illustrating an example of processing in which duplicate registration determination processing is performed in a case where the management server 103 issues a printer ID in the present embodiment.

In S1101, the management server 103 receives a printer ID issuance request transmitted from the registration application together with device identification information (here, a serial number). In S1102, the management server 103 issues a printer ID. Further, the management server 103 stores the issued printer ID and the serial number received in S1101 in the device ID management table 550 in association with each other.

In S1103, the management server 103 determines whether the serial number obtained in S1101 is held in the service management table 500. In a case where the determination result is YES, the processing proceeds to S1104, and, in a case where the determination result is NO, the processing proceeds to S1105. In a case where the obtained serial number has already been held in the service management table 500, there is a possibility of duplicate registration. Therefore, in S1104, the management server 103 refers to the service management table 500 and obtains service information including the service ID and the service type associated with the serial number obtained in S1101. In S1105, the management server 103 transmits the printer ID issued in S1102 and the service information obtained in S1104 to the registration application as a response to the printer ID issuance request in S1101.

On the other hand, in S1106, the management server 103 transmits the printer ID issued in S1102 to the registration application as a response to the printer ID issuance request in S1101.

Figure 12:
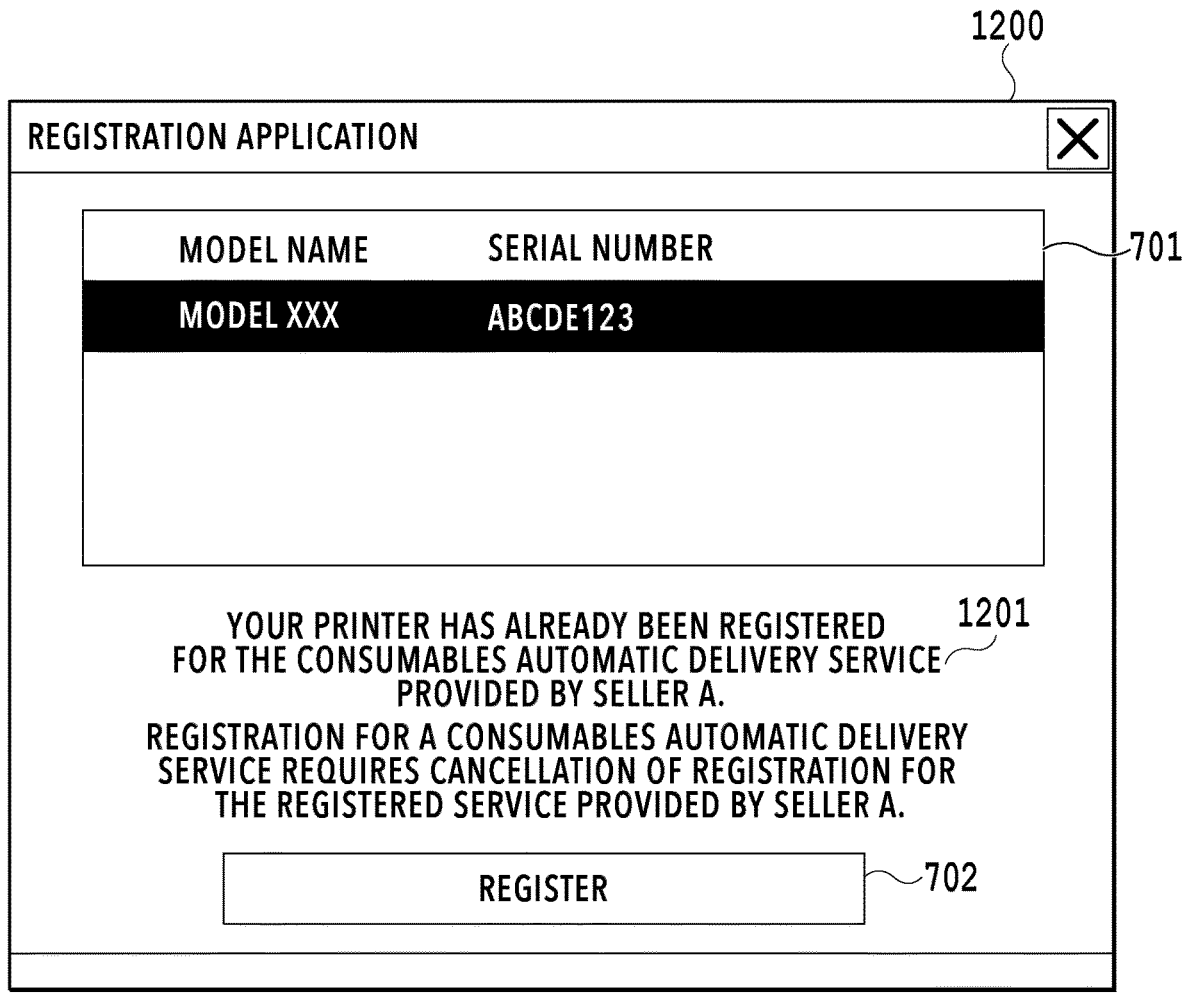
FIG. 12 is a schematic diagram of an interface of a registration application for displaying duplicate registration.

FIG. 12 is a diagram schematically illustrating a user interface 1200 of the registration application in a case where duplicate registration occurs. That is, FIG. 12 is a diagram of the user interface 1200 of the registration application in a case where the printer ID and the service information are received in S1105 of FIG. 11. After the registration application notifies the management server 103 of the printer ID issuance request, the registration application receives, from the management server 103, the printer ID and the service information including the service type and the service ID for which the image processing apparatus 102 has been registered. The registration application displays an explanatory text 1201 regarding the possibility of occurrence of duplicate registration based on the received service type and service ID. Note that, in the present embodiment, the registration application is configured to determine that there is a possibility of duplicate registration in a case of receiving service information as a response to a printer ID issuance request. Therefore, in a case where the management server 103 determines that there is a possibility of duplicate registration, the management server 103 performs processing of replying with a printer ID and service information. However, the present invention is not limited to this example. The management server 103 may transmit, to the registration application, a notification indicating that there is a possibility of occurrence of duplicate registration. In addition, the explanatory text 1201 may not be generated by the registration application, and the management server 103 may reply with information corresponding to the explanatory text 1201. Further, in a case where there is a possibility of occurrence of duplicate registration, the management server 103 may not reply with a printer ID.

Effect of Present Embodiment

As explained above, according to the present embodiment, the management server 103 can determine whether registration is duplicate registration for a service along with issuance of a printer ID and present the duplicate registration to a user through the registration application.

Other Embodiments

Although the management server is illustrated as one server in the above-described embodiments, the present invention is not limited thereto. The management server may be configured with multiple servers, such as a device management server that issues a printer ID and a service management server that manages storage of status information of a printer and transmission of status information of a printer to a service server. Moreover, although there are two service servers for convenience of explanation, the number of service servers may be one or more than three. Furthermore, the number of image processing apparatuses connected to the management server may be more than one.

Moreover, although the first embodiment and the second embodiment are explained separately, an embodiment in combination of both embodiments may be used.

Further, the management server 103 may also perform the above-described duplicate registration determination processing at the time of receiving the registration request with a serial number in S601. In a case where a registration request with a serial number is received from the service server 104, a service registration request for an unopened image processing apparatus is generally assumed. However, the example is not necessarily the case. Therefore, even in a case of receiving a registration request with a serial number, the management server 103 may perform duplicate registration determination processing illustrated in FIG. 10. In this case, processing of FIG. 10 with "PRINTER ID" and "SERIAL NUMBER" being reversed may be performed.

Further, in the above-described embodiments, an explanation is mainly given of a case in which the service type is consumables automatic delivery as an example. However, the service type is not limited to the example. It is possible to apply the present invention to any services as long as prevention of duplicate registration is desired. Further, in a case of a service type for which prevention of duplicate registration is not desired, the management server 103 may not transmit the duplicate registration notification even though service types match.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163651, filed Aug. 31, 2018, which is hereby incorporated by reference wherein in its entirety.

What is claimed is:

1. A management server used in an information processing system including an image processing apparatus, a service server related to a web service, and the management server, the management server being configured to manage registration of the image processing apparatus for the web service, the management server comprising:
   at least one memory storing a set of instructions; and
   at least one processor executing the set of instructions stored in the at least one memory to cause the at least one processor to perform operations comprising:
   a managing operation of managing first identification information and second identification information in association with each other, the first identification information and the second identification information corresponding to different types of identification information for identifying the image processing apparatus;
   a receiving operation of receiving the first identification information or the second identification information from the service server; and
   a registration operation of performing:
      first registration by which the first identification information is registered for a first web service, the first identification information being received in the receiving operation from a first service server and
      second registration by which the second identification information is registered for a second web service, the second identification information being received in the receiving operation from a second service server, and
   wherein the registration operation includes putting restriction on the second registration in a case where the received second identification information has been associated in the management operation with the first identification information having already been registered by the first registration.

2. The management server according to claim 1, wherein the at least one processor further performs:
   a second receiving operation of receiving the first identification information from an information processing apparatus; and
   a generating operation of generating the second identification information in response to reception of the first identification information in the second receiving operation, wherein the management operation includes managing the first identification information, which is received in the second receiving operation, and the second identification information, which is generated in the generating operation, in association with each other, and wherein the receiving operation includes receiving the second identification information, which has been generated in the generating operation, from the second service server.

3. The management server according to claim 2, wherein the at least one processor further performs:

a transmitting operation of transmitting the second identification information, which is generated in the generating operation, to the information processing apparatus, wherein the second service server is configured to:
receive the second identification information, which is transmitted to the information processing apparatus in the transmitting operation, from the information processing apparatus and
cause the management server to receive the received second identification information in the receiving operation.

4. The management server according to claim 1, wherein the at least one processor further performs:

a notifying operation of providing a predetermined notification together with the restriction in a case where the second identification information is associated with the first identification information in the management operation, the second identification information being received in the receiving operation from the second service server, the first identification information being received from the first service server and having already been registered by the first registration.

5. The management server according to claim 4, wherein the notifying operation includes providing the predetermined notification to the second service server.

6. The management server according to claim 1,
wherein the receiving operation includes receiving different service information from a plurality of service servers according to types of services provided by the plurality of service servers, and
wherein the registration operation includes putting the restriction on a condition that the type of the second web service matches the type of the first web service, based on service information received in the receiving operation from the first service server and the second service server, respectively.

7. The management server according to claim 1, wherein the image processing apparatus corresponds to a printer and at least one of the first web service and the second web service corresponds to a service relating to consumables used for the printer.

8. The management server according to claim 1, wherein the first identification information corresponds to an identifier statically assigned to the image processing apparatus.

9. The management server according to claim 8, wherein the identifier corresponds to at least one of a serial number and a MAC (Media Access Control) address.

10. An information processing system including an image processing apparatus, a service server related to a web service, an information processing apparatus, and a management server, the information processing apparatus being configured to perform registration for the web service, the management server being configured to manage registration of the image processing apparatus for the web service,
wherein the management server comprises:

at least one first memory storing a set of instructions; and
at least one first processor executing the set of instructions stored in the at least one first memory to cause the at least one first processor to perform operations comprising:
a management operation of managing first identification information and second identification information in association with each other, the first identification information and the second identification information corresponding to different types of identification information for identifying the image processing apparatus;
a receiving operation of receiving the first identification information or the second identification information from the service server; and
a registration operation of performing:
first registration by which the first identification information is registered for a first web service, the first identification information being received in the receiving operation from a first service server and
second registration by which the second identification information is registered for a second web service, the second identification information being transmitted in a transmitting operation by the information processing apparatus to a second service server and received in the receiving operation from the second service server,
wherein the information processing apparatus comprises:
at least one second memory storing a set of instructions; and
at least one second processor executing the set of instructions stored in the at least one second memory to cause the at least one second processor to perform operations comprising:
the transmitting operation of receiving the second identification information from the management server and transmitting the received second identification information to the service server,
and
wherein the registration operation includes putting restriction on the second registration in a case where the received second identification information has been associated in the management operation with the first identification information having already been registered by the first registration.

11. The information processing system according to claim 10,
wherein the at least one first processor of the management server further performs:
a second receiving operation of receiving the first identification information from the information processing apparatus; and
a generating operation of generating the second identification information in response to reception of the first identification information in the second receiving operation,
wherein the management operation includes managing the first identification information, which is received in the second receiving operation, and the second identification information, which is generated in the generating operation, in association with each other, and
wherein the receiving operation includes receiving the second identification information, which has beens generated in the generating operation, from the second service server.

12. The information processing system according to claim 11, wherein the at least one first processor of the management server further performs:
a second transmitting operation of transmitting the second identification information, which is generated in the generating operation, to the information processing apparatus, and
wherein the second service server is configured to:
receive the second identification information, which is transmitted to the information processing apparatus in the second transmitting operation, from the information processing apparatus and
cause the management server to receive the received second identification information in the receiving operation.

13. The information processing system according to claim 10, wherein the at least one first processor of the management server further performs:
a notifying operation of providing a predetermined notification together with the restriction in a case where the second identification information is associated with the first identification information in the management operation, the second identification information being received in the receiving operation from the second service server, the first identification information being received from the first service server and having already been registered by the first registration.

14. The information processing system according to claim 13, wherein the notifying operation includes providing the predetermined notification to the second service server.

15. The information processing system according to claim 10,
wherein the receiving operation includes receiving different service information from a plurality of service servers according to types of services provided by the plurality of service servers, and
wherein the registration operation includes putting the restriction on a condition that the type of the second web service matches the type of the first web service, based on service information received in the receiving operation from the first service server and the second service server, respectively.

16. The information processing system according to claim 10, wherein the image processing apparatus corresponds to a printer and at least one of the first web service and the second web service corresponds to a service relating to consumables used for the printer.

17. The information processing system according to claim 10, wherein the first identification information corresponds to an identifier statically assigned to the image processing apparatus.

18. The information processing system according to claim 17, wherein the identifier corresponds to at least one of a serial number and a MAC (Media Access Control) address.

19. An information processing method used in an information processing system including an image processing apparatus, a service server, an information processing apparatus, and a management server, the service server being configured to provide a web service, the information processing apparatus being configured to perform registration for the web service, the management server being configured to manage registration of the image processing apparatus for the web service, the information processing method comprising:
memorizing first identification information and second identification information in association with each other, the first identification information and the second identification information corresponding to different types of identification information for identifying the image processing apparatus, the memorizing being performed by the management server;
transmitting the second identification information received from the management server to the service server, the transmitting being performed by the image processing apparatus;
receiving the first identification information or the second identification information from the service server, the receiving being performed by the management server; and
first registration by which the first identification information is registered for a first web service, the first identification information being received in the receiving from a first service server that provides the first web service and
second registration by which the second identification information is registered for a second web service, the second identification information being transmitted by the information processing apparatus in the transmitting to a second service server that provides the second web service and received in the receiving from the second service server, and
wherein restriction is put on the second registration of the received second identification information in a case where the second identification information is associated with the first identification information, in the memorizing, having already been registered by the first registration.

* * * * *